United States Patent [19]

Bassett

[11] Patent Number: 4,789,375

[45] Date of Patent: Dec. 6, 1988

[54] SPRING DAMPER DRIVE FOR A CLUTCH DRIVEN DISC ASSEMBLY

[75] Inventor: Michael L. Bassett, Auburn, Ind.

[73] Assignee: Dana Corporation, Toledo, Ohio

[21] Appl. No.: 942,482

[22] Filed: Dec. 16, 1986

[51] Int. Cl.$^4$ .................................................. F16D 3/14
[52] U.S. Cl. .................................. 464/68; 192/106.2; 464/64
[58] Field of Search .......................... 192/106.1, 106.2; 464/64, 66, 68

[56] References Cited

U.S. PATENT DOCUMENTS

| | | | |
|---|---|---|---|
| 2,274,174 | 2/1942 | Wemp | 192/106.2 |
| 2,286,502 | 6/1942 | Newton | 192/106.2 |
| 2,437,537 | 3/1948 | Kelleher | 464/68 |
| 3,060,705 | 10/1962 | Stenger | 464/68 |
| 3,095,716 | 7/1963 | Smirl | 464/68 |
| 4,148,200 | 4/1979 | Schallhorn et al. | 192/106.2 X |
| 4,254,855 | 3/1981 | Hildebrand et al. | 192/106.2 |
| 4,537,296 | 8/1985 | Lech, Jr. et al. | 464/68 X |
| 4,555,009 | 11/1985 | Habel et al. | 192/106.2 |

FOREIGN PATENT DOCUMENTS 3315484 10/1984 Fed. Rep. of Germany ........ 464/66

*Primary Examiner*—Daniel P. Stodola
*Attorney, Agent, or Firm*—MacMillan, Sobanski & Todd

[57] ABSTRACT

A spring damper drive for a clutch driven disc assembly. The assembly includes a pair of spaced outer covers connected to a generally cylindrical central hub. An annular support plate is disposed about the hub between the outer covers and is rotatable relative thereto throughout a limited distance. The outer covers and the support plate each have respective pluralities of openings formed therethrough. The openings are adapted to be aligned with one another so as to receive and retain respective pairs of dampening coil springs therein. Each spring opening is shaped generally in the form of a truncated sector, having a linear inner wall oriented perpendicularly to a bisecting radius of the outer cover, a pair of end walls extending perpendicularly outwardly from each end of the linear inner wall, and an arcuate outer wall connecting the two end walls. The peripheries of the spring openings formed in the two outer covers are defined by flanges which extend thereabout in opposed fashion. The radially outermost corners of each of those flanges are formed having shoulders which extend inwardly from the arcuate outer wall. The shoulders are provided to re-position the ends of the coil springs according to the amount of compression thereof caused by rotation of the support plate relative to the outer covers. As a result, the springs are properly positioned throughout relatively large amplitudes of angular displacement of the support plate relative to the outer covers, and premature wear of the springs is avoided.

22 Claims, 3 Drawing Sheets

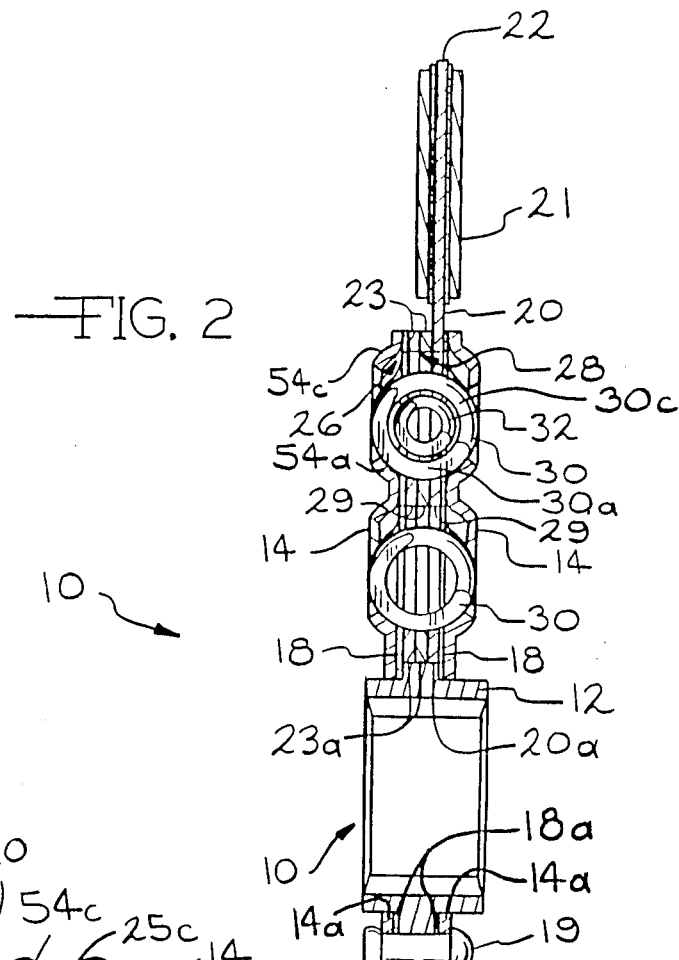
FIG. 2
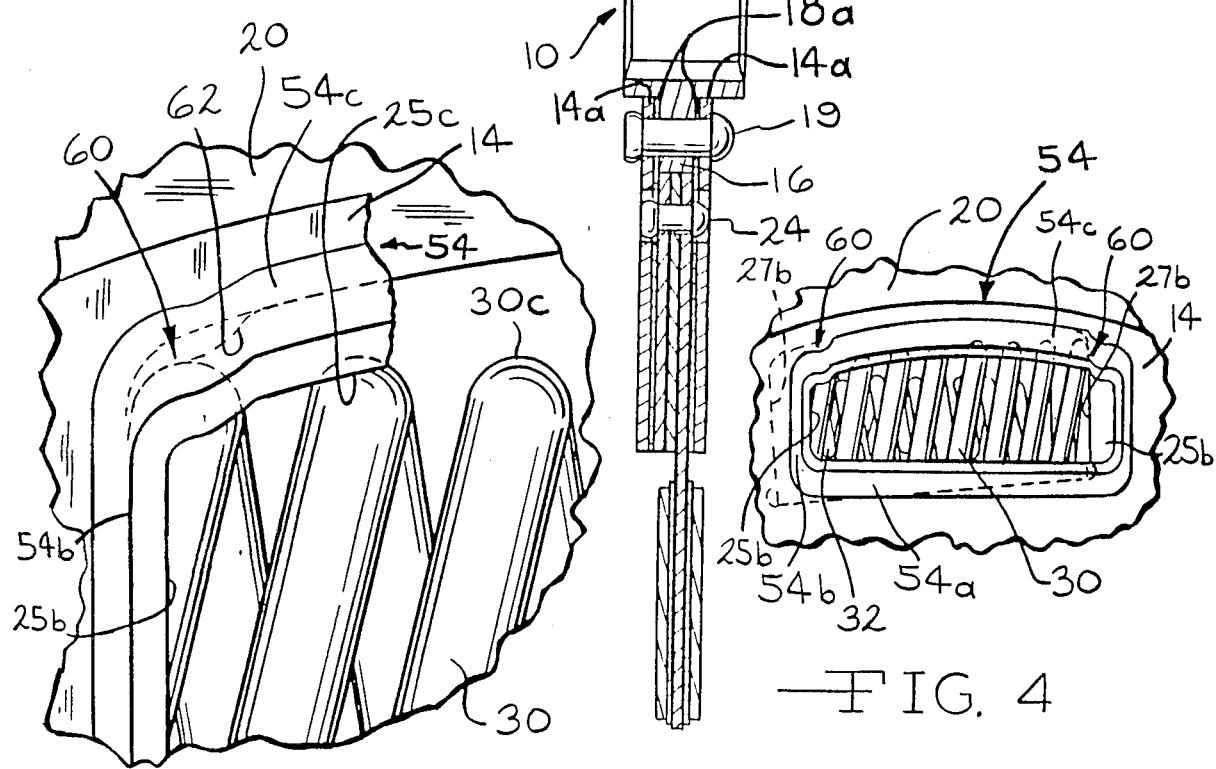
FIG. 3
FIG. 4

SPRING DAMPER DRIVE FOR A CLUTCH DRIVEN DISC ASSEMBLY

BACKGROUND OF THE INVENTION

The present invention relates in general to rotary torque transmitting devices and in particular to an improved spring damper arrangement for use in a clutch driven disc assembly.

In most passenger cars and trucks, objectionable vibrations may be generated in the vehicle drive line at certain speeds and load conditions. Some of these disturbances may be eliminated, or reduced to an acceptable level, by incorporating a torsional damper in the driven disc assembly of the vehicle clutch. Typically, such dampers include a plurality of circumferentially spaced coiled springs operatively connected between two relatively rotatable elements of the clutch driven disc assembly.

Clutches having dampers similar to that described above are widely used in vehicular rotary torque transmitting systems. Usually, the two elements of the clutch driven disc assembly are permitted to rotate relative to each other by a relatively small amplitude, approximately ten degrees or less. In such situations, conventional dampers have been found to operate sufficiently well. In certain applications, however, the two elements may be permitted to rotate relative to each other by a relatively large amplitude, up to twenty degrees or more. In dampers which permit such relatively high amplitudes of rotational displacement, proper positioning of the circumferentially spaced springs has been found to be more difficult to achieve and maintain. Improper spring positioning in such a damper can result in undue stress on the springs and spring engaging surfaces which, in turn, can cause premature damper failure.

SUMMARY OF THE INVENTION

The present invention relates to an improved spring damper drive for a clutch driven disc assembly. The assembly includes a pair of spaced outer covers connected to a generally cylindrical central hub. An annular support plate is disposed about the hub between the outer covers and is rotatable relative thereto throughout a limited distance. The outer covers and the support plate each have respective pluralities of openings formed therethrough. The openings are adapted to be aligned with one another so as to receive and retain respective pairs of dampening coil springs therein. Each spring opening is shaped generally in the form of a truncated sector, having a linear inner wall oriented perpendicularly to a bisecting radius of the outer cover, a pair of end walls extending perpendicularly outwardly from each end of the linear inner wall, and an arcuate outer wall connecting the two end walls. The peripheries of the spring openings formed in the two outer covers are defined by flanges which extend thereabout in opposed fashion. The radially outermost corners of each of those flanges are formed having shoulders which extend inwardly from the arcuate outer wall. The shoulders are provided to re-position the ends of the coil springs according to the amount of compression thereof caused by rotation of the support plate relative to the outer covers. As a result, the springs are properly positioned throughout relatively large amplitudes of angular displacement of the support plate relative to the outer covers, and premature wear of the springs is avoided.

It is an object of the present invention to provide an improved spring damper drive for a clutch driven disc assembly.

It is another object of the present invention to provide such a spring damper drive which permits relatively large amplitudes of angular displacement, while maintaining proper spring positioning throughout.

Other objects and advantages of the present invention will become apparent to those skilled in the art from the following detailed description of the preferred embodiment, when read in light of the accompanying drawings.

BRIEF DESCRIPTION OF THE DRAWINGS

FIG. 2 is an enlarged sectional elevational view taken along line 2—2 of FIG. 1.

FIG. 3 is an enlarged fragmentary end elevational view, partially broken away, of one outer corner of one of the spring openings of the clutch driven disc assembly illustrated in FIGS. 1 and 2.

FIG. 4 is an enlarged fragmentary end elevational view of one of the spring openings of the clutch driven disc assembly illustrated in FIGS. 1, 2, and 3, the support plate being shown in an engaged position relative to the hub.

DETAILED DESCRIPTION OF THE PREFERRED EMBODIMENT

Figure 1:
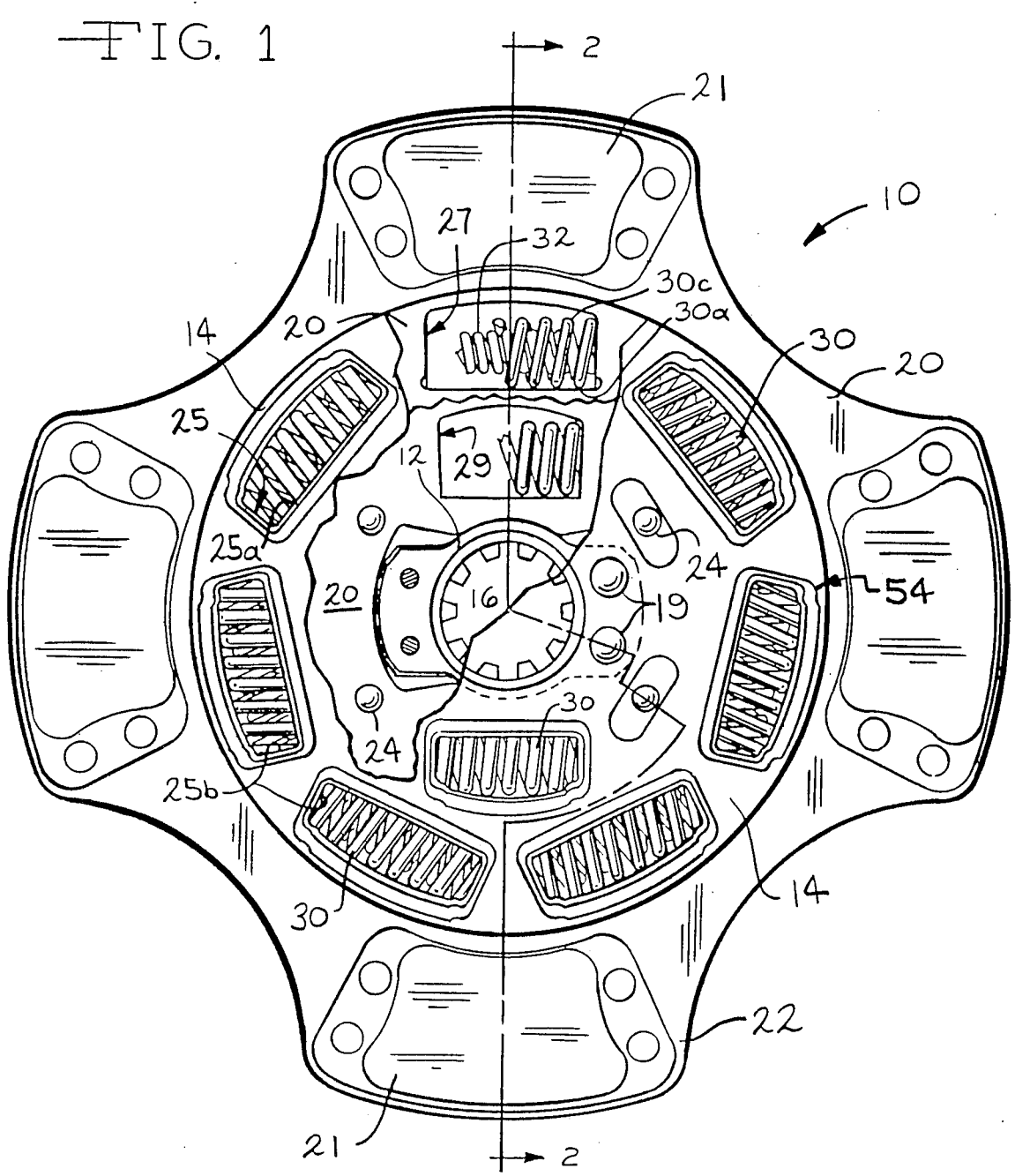
FIG. 1 is an end elevational view, partially broken away, of a clutch driven disc assembly in accordance with the present invention, the support plate being shown in a neutral position relative to the hub.

Referring now to the drawings, there is illustrated a rotary torque transmitting device, indicated generally at 10, including an improved spring damper drive in accordance with the present invention. Typically, the rotary torque transmitting device 10 constitutes a driven disc assembly of a clutch (not shown). The clutch is normally positioned in a vehicle drive train between an engine and a transmission. In general, the disc assembly 10 includes two rotary torque transmitting elements which are rotatable relative to one another throughout a limited angular distance. The rotary torque transmitting elements are connected together by a lost motion connection and by a spring damper drive. The lost motion connection is utilized to establish a positive driving connection between the two rotary torque transmitting elements, while permitting a limited range of free movement therebetween. The spring damper drive is utilized to establish a resilient driving connection between the two rotary torque transmitting elements within the limited range of free movement permitted by the lost motion connection. The spring damper drive can also be utilized to tune the vehicle drive train so as to prevent vibrations from occurring therein within the operating speed range of the engine.

In the preferred embodiment of the invention, the first rotary torque transmitting element of the disc assembly 10 is formed from a generally cylindrical hub 12 and a pair of spaced apart outer covers 14. The hub 12 is generally hollow and cylindrical in shape, but has an integral radially outwardly-extending flange 16 formed at or near the longitudinal center thereof. The outer covers 14 have respective central apertures 14a formed therein which permit the outer covers 14 to be disposed about the hub 12 on either side of the hub flange 16. A pair of secondary covers 18 are also provided in the disc assembly 10. The secondary covers 18 have respective central apertures 18a formed therein which permit the secondary covers 18 to be disposed between each of the outer covers 14 and the hub flange 16. The outer covers 14 and the secondary covers 18 are all secured to the hub flange 16 by a plurality of rivets 19 spaced about the circumference of the hub 12. The rivets 19 extend through respective apertures formed through the outer covers 14, the secondary covers 18, and the hub flange 16 to form a unitary structure for the first rotary torque transmitting element.

The second rotary torque transmitting element of the disc assembly 10 is formed from a support plate 20. The support plate 20 includes a central aperture 20a which permits the support plate 20 to be disposed about the hub flange 16 between the secondary covers 18. The support plate 20 has a plurality of friction pads 21 secured to the opposed sides thereof. Two of the friction pads 21 are secured to the opposite sides of the radially outermost portions of each of a plurality of radially extending arms 22 formed integrally with the support plate 20. As best illustrated in FIG. 2, a pair of reinforcing plates 23 are provided, each having respective central apertures 23a formed therein. The reinforcing plates 23 are disposed about the hub flange 16 between the support plate 20 and one of the secondary covers 18. The reinforcing plates 23 are securely fastened to the support plate 20 by a plurality of rivets 24. The rivets 24 extend through respective apertures formed through the reinforcing plates 23 and the support plate 20 to form a unitary structure for the second rotary torque transmitting element.

As is well known, the hub 12 may be splined onto an input shaft (not shown) of the vehicle transmission such that the friction pads 21 attached to the support plate 20 are disposed between an axially movable clutch pressure plate and an axially stationary engine driven flywheel (neither shown). Thus, the disc assembly 10 rotates with the transmission input shaft and is permitted to move axially along such shaft throughout a limited distance.

The outer covers 14 and the secondary covers 18 are each formed with respective pluralities, perferably at least seven, of spring openings, indicated generally at 25 and 26. Similarly, the support plate 20 and the reinforcing plates 23 are each provided with respective pluralities of spring openings 27 and 28. The spring openings 25, 26, 27, and 28 may be aligned with each other, as illustrated in FIG. 1, and may be formed in an evenly spaced circular array about the disc assembly 10. Additional spring openings, indicated generally at 29, may be provided within the circular array if desired. The spring openings 25, 26, 27, 28, and 29 are all shaped generally in the shape of a truncated sector. Referring specifically to the outer cover 14, the outer cover spring opening 25 is formed having a linear inner wall 25a oriented perpendicularly to a bisecting radius of the outer cover 14, a pair of end walls 25b extending perpendicularly outwardly from each end of the linear end wall 25a, and an arcuate outer wall 25c connecting the two end walls 25b.

In accordance with the teachings of U.S. Pat. No. 4,254,855 to Hildebrand et al., each of the spring openings 25, 26, 27, 28, and 29 is adapted to receive and retain a first coil spring 30 therein. The disclosure of that patent is hereby incorporated by reference. A second plurality of coil springs 32 may be provided having smaller outer diameters than the inner diameters of the first plurality of coil springs 30. Each of the second plurality of coil springs 32 can be disposed within a respective one of the first plurality of coil springs 30 so as to be retained within the spring openings 25, 26, 27, and 28. Each of the first and second pluralities of coil springs 30 and 32 extends throughout the spring openings 25, 26, 27, and 28 and normally has its longitudinal axis oriented transversely relative to a bisecting radius of the disc assembly 10. Although the present invention is disclosed as having the first and second pluralities of coil springs 30 and 32, it should be understood that the use of the second plurality of coil springs 32 is optional in the present invention.

As described in the above-referenced patent, the coil springs 30 and 32 provide a resilient driving connection between the two rotary torque transmitting elements of the disc assembly 10. A positive driving connection is also provided between the two rotary torque transmitting clutch elements. The positive driving connection is accomplished through a lost motion connection designed to permit the first and second pluralities of the coil springs 30 and 32 to resiliently drive the driven member before any positive drive is established between the two rotary torque transmitting elements. The positive driving connection and the lost motion connection are described in detail in the above-referenced patent.

Each of the spring openings 25 formed in each of the outer covers 14 has a flange, indicated generally at 54, formed about the periphery thereof. As best shown in FIG. 2, the flanges 54 are formed integrally with the outer covers 14. The flanges 54 formed on one of the outer covers 14 generally extend in one axial direction, while the flanges 54 formed on the other of the outer covers 14 generally extend in an opposite axial direction. Each flange 54 includes an inner wall portion 54a, of pair of opposed end portions or spring end reaction areas 54b, and an arcuate outer wall portion 54c. The flanges portions 54a, 54b, and 54c extend along the corresponding linear inner wall 25a, the opposed end walls 25b, and the arcuate outer wall 25c of each of the spring openings 25, respectively.

As best illustrated in FIG. 2, the flange portions 54a and 54c are disposed at an angle which is less than ninety degrees relative to the plane defined by the disc assembly 10. The flange portions 54a and 54c are angled in this manner to conform to the curvature of the outer diameter of the springs 30. As a result, the flange portions 54a and 54c retain the first and second pluralities of coil springs 30 and 32 within the spring openings 25. The flange portions 54a and 54c also provide clearance for the first and second pluralities of coil springs 30 and 32 to move as the support plate 20 is rotated relative to the outer covers 14, as will be described in detail below. The end wall flange portions 54b are angled outwardly also, but preferably extend in a direction which is perpendicular relative to the plane of the outer covers 14. Such perpendicular orientation of the end wall flange portions 54b is preferable because it provides opposed parallel surfaces which are perpendicular to the longitudinal axes of the coil springs 30 and 32. As a result, the longitudinal axes of the ends of the coil springs 30 and 32 are not flexed out from the plane defined by the disc assembly 10 when the ends of the springs 30 and 32 engage the end wall flange portions 54b.

Figure 5:
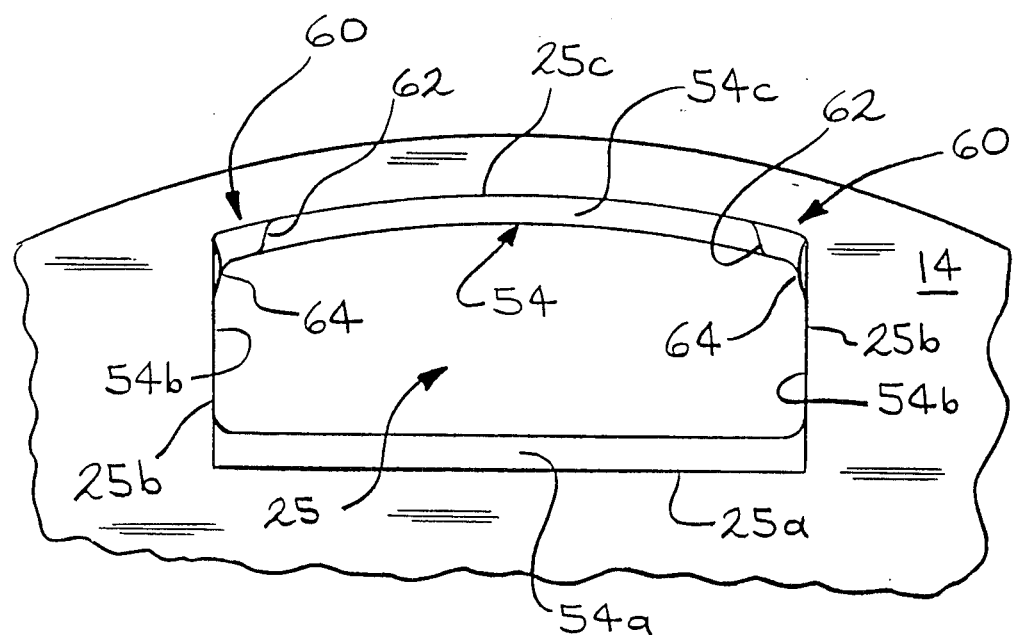
FIG. 5 is an enlarged fragmentary end elevational view one of the spring openings of the outer cover illustrated in FIGS. 3 and 4 taken from the reverse direction.

As best illustrated in FIG. 5, the inner surface (i.e., the surface which contacts the outermost outer surface 30c of each coil spring 30) of each of the outer wall portions 54c of the flanges 54 is formed having a pair of shoulders, indicated generally at 60. The shoulders 60 are formed in the outer wall flange portion 54c adjacent the junction thereof with each of the end wall flange portions 54b. The shoulders 60 curve inwardly from the outer wall flange portions 54c. As a result, a first concave spring containment surface 62 and a second concave ramp surface 64 are formed on the outer wall flange portion 54c defining the two sides of each of the shoulders 60. The first concave surface 62 provides a smooth transition inwardly from the outer wall flange portion 54c to the shoulder 60, while the second concave surface 64 provides a smooth transition from the shoulder 60 to the end wall flange portion 54b. As will be explained in detail below, the shoulders 60, as well as the first and second concave surfaces 62 and 64, are provided to re-position the ends of each coil spring 30 as it is compressed and moved during rotation of the support plate 20 relative to the outer covers 14.

The size of each of the shoulders 60 is relatively small in comparison with the size of the respective spring opening 25. For example, a typical spring opening 25 may be formed having approximately 2.638 inches separating the opposed end walls 25b thereof, while the linear inner wall 25a may be separated from the arcuate outer wall 25c by approximately 0.938 inches at the center of the spring opening 25. For such a spring opening 25, the distance from the end wall flange portion 54b to the center of the shoulder 60 may be approximately 0.100 inch. The distance from that point of the shoulder 60 to the outer wall flange portion 54c may also be approximately 0.100 inch. Depending upon the particular application, however, the relative sizes and shapes of the shoulders 60 may be varied.

Initially, the disc assembly 10 is assembled as illustrated in FIGS. 1 through 3. As shown therein, the ends of each of the coil springs 30 initially abut the opposed end walls 25b of the spring openings 25 formed in the outer covers 14. The ends of each of the springs 30 also abut the respective end walls of the spring openings 27 formed in the the support plate 20, which are aligned with the end walls 25b. As best shown in FIG. 1, the innermost outer surface 30a of each spring 30 is engaged by the corresponding angled inner surface of the inner wall flange portion 54b while the outermost outer surface 30c of each spring 30 is engaged by the outer wall flange portion 54c. The innermost and outermost outer surfaces 30a and 30c both abut the end wall portion 54b of the flange 54 in this initial configuration.

When the support plate 20 is rotated counter-clockwise relative to the outer covers 14, as illustrated in FIG. 4, each springs 30 is compressed between the right end wall 27b of the support plate spring opening 27 (which is moved relative to the outer covers 14) and the relatively stationary left end wall 25b of the outer cover spring opening 25. Such relative rotational movement is transmitted through the springs 30 so as to provide a resilient driving connection between the support plate 20 and the outer covers 14, as described in the above referenced patent. Because of the engagement of the right end of the spring 30 by the right end wall 27b, the right end of the spring 30 is moved away from the relatively stationary right end wall 25b of the outer cover spring opening 25. As it moves, the outermost outer surface 30c of the spring 30 initially slides along the second concave surface 64 into contact with the shoulder 60. The innermost outer surface 30a of the spring 30 slides along the inner wall portion 54a of the flange 54. As the support plate 20 is continued to be rotated relative to the outer covers 14 past a predetermined amplitude of angular displacement, the outermost outer surface 30c of the first coil spring 30 further slides along the first concave surface 62 into contact with the outer wall portion 54c of the flange 54.

When the support plate 20 is subsequently rotated clockwise relative to the outer covers 14 back to the neutral position illustrated in FIG. 1, the right end of the spring 30 slides in the opposite direction along the outer wall flange portion 54c until the outermost outer surface 30c thereof engages the first concave surface 62 of the shoulder 60. At that point, the outermost portion of the right end of the spring 30 is retained on the shoulder 60 because of the radially outward urging of the spring 30. Therefore, further sliding movement of the outermost outer surface 30c of the right end of the spring 30 is prevented, even though the right end wall 27b of the support plate spring opening 27 continues to move back to the neutral position illustrated in FIG. 1. The innermost outer surface 30a of the spring 30, however, continues to slide along the linear inner wall flange portion 54a until it abuts the end wall 54b. Thus, the radially outermost portion of the right end of the spring 30 remains spaced apart from the right end walls 25b and 27b of the outer cover spring opening 25 and the support plate spring opening 27, respectively, when the support plate 20 is returned to its neutral position relative to the outer covers 14.

When the support plate 20 is subsequently rotated from the neutral position in the clockwise direction relative to the outer covers 14, the left end of each of the springs 30 is engaged and moved by the left end wall 27b of the support plate spring opening 27 in a manner similar to that described above. During such movement, the spring 30 is compressed and, therefore, exerts an axial force resisting such compression. When the compression force of the spring 30 exceeds a predetermined value (i.e., when the angular displacement of the support plate 20 relative to the outer covers 14 exceeds a predetermined value), the outermost outer surface 30c of the right end of the spring 30 (which has been maintained in spaced apart relationship from the end walls 25b and 27b of the outer cover spring opening 25 and the support plate spring opening 27, respectively, because of its engagement with the shoulder 60, as described above) will slide over the shoulder 60 and along the second concave surface 64 into engagement with the right end wall 25b of the outer cover spring opening 25. The amount of the compression force required for the outermost outer surface 30c of the spring 30 to overcome its radially outward urging and slide past the shoulder 60 may be predetermined as desired by varying the size and shape of the shoulder 60, as mentioned above, and the size and shape of the first coil spring 30.

When the outermost outer surface 30c of the spring 30 is moved over the shoulder 60 into engagement with the right end wall 25b, the right end of the spring 30 is moved into the relatively smaller pocket defined by the junction of the end wall flange portion 54b with the inner wall flange portion 54a and the shoulder 60. The right end of the spring 30 will remain in this pocket until it is moved out of it by counter-clockwise rotation of the support plate 20 relative to the outer covers 14, as described above. The left end of the spring 30 moves in an opposite, but otherwise identical fashion as the right end of the spring 30.

The above-described structure of the present invention solves two problems which are known to cause premature wear and failure of the springs 30 in a disc assembly which permits a relatively high amount of relative angular displacement. The first problem is that the springs 30 are flexed such that the longitudinal axes thereof extend in an arcuate fashion, rather than in a preferred linear fashion. The flexing of the springs in this manner creates additional internal stresses within the springs 30 which reduce the life span thereof. The second problem is that the ends of the springs 30 tend to expand in diameter and unwind somewhat when subjected to relatively large compression forces. As a result, the ends of the springs 30 rub against the end wall portions 54b, causing wear and possible fractures.

The present invention minimizes the impact of these two problems on the springs 30. First, the re-positioning of the ends of the springs 30 permits the longitudinal axes of the springs 30 to remain closer to the desired linear orientation than would otherwise be possible. This is accomplished by the selective engagement and retention of the ends of the springs 30 on the shoulders 60. When the disc assembly 10 is in the neutral position or close thereto, one of the ends of each spring 30 is engaged by one of the shoulders 60. As a result, the arc defining the longitudinal axis of the spring 30 is effectively reduced. However, when the amount of angular displacement increases, the angular orientation of the end walls 25b and 27b engaged by the spring 30 approaches a parallel arrangement. Thus, the shoulder 60 permits the end of the spring to be moved into engagement with the end wall 25b after a predetermined amount of angular displacement has occurred.

Simultaneously with the re-positioning of the end of the spring 30, the spring end is retained within the relatively smaller pocket of the spring opening 25. Consequently, the end of the spring 30 is engaged about its periphery such that it is prevented from expanding in diameter and unwinding under the spring compression forces. Such engagement of the spring end continues until the disc assembly 10 is returned to its neutral position, where such engagement is unnecessary.

In the rotary torque transmitting device 10 described above, the spring damper connection can easily be modified to fit numerous requirements. For example, the torque and deflection rates of the device 10 can be increased or decreased by modifying the structure of the springs 30 and 32 so that their capacities vary to suit a particular application. Thus, the spring damper assembly of the present invention can easily be adapted to provide the damping which is necessary to tune the vehicle drive train so that torsional vibrations do not occur. Furthermore, the springs 30 and 32 can be constructed in the form of one or more solid or tubular rubber elements. As an example, the outer spring 30 could be replaced by a tubular rubber sleeve, while the inner spring 32 could be replaced by a solid rubber rod or a tubular rubber sleeve.

In accordance with the provisions of the patent statutes, the principle and mode of operation of the present invention have been explained and illustrated in its preferred embodiment. However, it must be understood that the present invention may be practiced otherwise than as specifically explained and illustrated without departing from its spirit or scope.

What is claimed is:

1. A torque transmitting device comprising:
   a rotatable annular disc member having an opening therein;
   a rotatable hub member adapted for limited co-axial rotation relative to said disc member;
   an annular cover secured to said hub member for rotation therewith, said cover being positioned adjacent to said disc member and having an opening therein at least partially aligned with said opening in said disc member; and
   a spring having a first and second end, said spring being partly positioned in said opening in said cover and partly positioned in said opening in said disc member for resiliently and drivingly connecting said disc member and said hub member and for resiliently urging said disc member and said hub member to relative positions of angular rotation with respect to one another wherein said opening in said cover and said opening in said disc member are substantially completely aligned with one another;
   wherein a portion of said cover adjacent to said opening has a spring end reaction area and a ramp for deflecting said first end of said spring radially inwardly to engage said spring end reaction area when a given force is applied to said second end of said spring, and a spring containment surface disposed radially outwardly from said spring end reaction area, said ramp being positioned between said spring end reaction area and said spring containment surface.

2. A torque transmitting device according to claim 1 wherein said cover is a first cover and further comprising:
   a second annular cover secured to said hub member for rotation therewith, said second annular cover having an opening therein, said opening in said second cover being at least partially aligned with said opening in said disc member, said second cover extending generally parallel to said first cover, said disc member being positioned between said first and second covers.

3. A torque transmitting device according to claim 1 wherein said cover comprises lip means surrounding said opening and extending outwardly from said cover in a direction which is away from said disc member, said lip means conforming in shape to said spring and serving to retain said spring partly positioned in said opening in said cover and partly positioned in said opening in said disc member.

4. A torque transmitting device according to claim 3 wherein said lip means comprises a continuous lip that surrounds said opening in said cover.

5. A torque transmitting device according to claim 1 wherein said spring containment surface has a concave curvature.

6. A torque transmitting device comprising:
   a rotatable annular disc member having a plurality of spaced apart openings therein disposed in a circular array;
   a rotatable hub member adapted for limited co-axial rotation relative to said annular disc member;
   an annular cover secured to said hub member for rotation therewith, said cover being positioned adjacent to said disc member and having a plurality of spaced apart openings therein disposed in a circular array, each of said plurality of openings in said cover being at least partly aligned with one of said plurality of openings in said disc member; and a plurality of spring means, each of said spring means having a first end and a second end and being partly positioned in one of said plurality of openings in said disc member and partly positioned in the one of said plurality of openings in said cover, said plurality of spring means resiliently and drivingly connecting said disc member and said hub member to resiliently urge said disc member and said hub member to relative positions of angular rotation with respect to one another wherein said each of said plurality of openings in said cover and said openings in said disc member are substantially completely aligned with one another;

wherein said cover has, adjacent to each of the openings in said cover, a spring means end reaction area and a ramp for deflecting said first ends of said spring means radially inwardly to engage said spring means end reaction area when a given force is applied to said second ends of said spring means, said cover further comprising, adjacent to said each of the openings in said cover, a spring means containment surface disposed radially outwardly from said spring means end reaction area, said ramp being positioned between said spring end reaction area and said spring containment surface.

7. A torque transmitting device according to claim 6 wherein said plurality of spring means comprises at least seven spring means.

8. A torque transmitting device according to claim 6 wherein each of said plurality of spring means comprises a coil spring.

9. A torque transmitting device according to claim 8 wherein said each of said plurality of spring means further comprises a second coil spring, said second coil spring being co-axially disposed within said coil spring.

10. A torque transmitting device according to claim 6 wherein each of said plurality of spring means has a longitudinal central axis extending generally transversely of a radius of said circular array that extends through said spring means.

11. A torque transmitting device according to claim 6 wherein said cover is a first cover and further comprising:

a second annular cover secured to said hub member for rotation therewith, said second cover extending generally parallel to said first cover, said disc member being positioned between said first and second covers, said second cover having a plurality of spaced apart openings therein, each of said openings in said second cover being at least partly aligned with one of said plurality of openings in said disc member.

12. A torque transmitting device according to claim 6 wherein said cover comprises a plurality of lip means, one of the plurality of lip means surrounding each of said openings in said cover and extending outwardly from said cover in a direction which is away from said disc member, each of said lip means conforming in shape to the one of said plurality of spring means that is partly positioned in said each of said openings to retain said spring means therein.

13. A torque transmitting device according to claim 12 wherein said one of the lip means comprises a continuous lip that surrounds said each of said openings in said cover.

14. A torque transmitting device according to claim 6 wherein said spring containment surface has a concave curvature.

15. A torque transmitting device comprising:

a rotatable annular disc member having a plurality of spaced apart openings therein disposed in a circular array;

a rotatable hub member adapted for limited co-axial rotation relative to said disc member;

first and second annular covers secured to said hub member for rotation therewith, said first and second covers extending generally parallel to one another, said disc member being positioned between and adjacent to said first and second covers, each of said first and second covers having a plurality of spaced apart openings therein disposed in a circular array, each of said openings in said first and second covers being at least partly aligned with one of said openings in said disc member; and a plurality of spring means, each of said spring means having a first end and a second end and being partly positioned in one of said openings in said disc member, partly positioned in one of said openings in said first cover, and partly positioned in one of said openings in said second cover, said plurality of spring means resiliently and drivingly connecting said disc member and said hub member to resiliently urge said disc member and said hub member to relative positions of angular rotation with respect to one another wherein each of said openings in said disc member, said first cover, and said second cover are substantially completely aligned with one another;

wherein each of said first and second annular covers has, adjacent to each of the openings, a spring means end reaction area and a ramp for deflecting the first ends of said spring means that is partly positioned in said openings radially inwardly to engage said spring end reaction area when a given force is applied to said second ends of said spring means, each of said first and second covers further comprising, adjacent to said each of said openings, a spring means containment surface disposed radially outwardly of said spring means end reaction area.

16. A torque transmitting device according to claim 15 wherein said plurality of spring means comprises at least seven spring means.

17. A torque transmitting device according to claim 15 wherein each of said plurality of spring means comprises a coil spring.

18. A torque transmitting device according to claim 17 wherein each of said plurality of spring means further comprises a second coil spring, said second coil spring being disposed co-axially within said coil spring.

19. A torque transmitting device according to claim 15 wherein each of said plurality of spring means has a longitudinal central axis extending generally transversely of a radius of said circular array that extends through said spring means.

20. A torque transmitting device according to claim 15 wherein each of said first and second covers comprises a plurality of lip means, one of the plurality of lip means surrounding each of said openings in said covers extending outwardly from said covers in a direction which is away from said disc member, each of said lip means conforming in shape to the one of said plurality of spring means that is partly positioned in said each of said openings to retain said spring means therein.

21. A torque transmitting element for a driven disc assembly in a clutch comprising:
    a cover having a central aperture and at least one opening formed therethrough, said opening adapted to receive a spring means therein and including an inner wall, a pair of end walls extending outwardly from said inner wall, and an outer wall extending between said end walls; and
    a flange including an end portion extending along one of said end walls and an outer portion extending along said outer wall, said flange further including a projecting shoulder formed at the junction of said outer portion with said end portion, said shoulder adapted to selectively engage an end of said spring means when received in said opening.

22. A driven disc assembly for a clutch comprising:
    a first rotary torque transmitting element having a central aperture and at least one opening formed therethrough;
    a second rotary torque transmitting element having a central aperture and at least one opening formed therethrough, said second torque transmitting element being connected to said first rotary torque transmitting element for rotation relative thereto;
    a flange formed about the periphery of one of said openings, said flange including an inner portion, a pair of end portions extending outwardly from each end of said inner portion, and an outer portion extending between each of said end portions, said flange further including a projecting shoulder formed at the junction of said outer portion with one of said end portions; and
    spring means disposed in said first and second openings to provide a resilient driving connection between said first and second rotary torque transmitting elements, said spring means including an outer surface adapted to engage said flange outer portion and an end adapted to selectively engage said shoulder and said flange end portion during relative rotation of said first and second torque transmitting elements.

* * * * *

UNITED STATES PATENT AND TRADEMARK OFFICE
CERTIFICATE OF CORRECTION

PATENT NO. : 4,789,375
DATED : December 6, 1988
INVENTOR(S) : MICHAEL L. BASSETT It is certified that error appears in the above-identified patent and that said Letters Patent is hereby corrected as shown below:

Column 8, line 15, after "first" insert -- end --.

Column 8, line 15, after "and" insert -- a --.

Signed and Sealed this

Sixth Day of June, 1989

Attest:

DONALD J. QUIGG

Attesting Officer

Commissioner of Patents and Trademarks